United States Patent
Kakuta

(10) Patent No.: US 10,237,447 B2
(45) Date of Patent: Mar. 19, 2019

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Hitoshi Kakuta, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/194,133

(22) Filed: Jun. 27, 2016

(65) Prior Publication Data
US 2016/0381252 A1    Dec. 29, 2016

(30) Foreign Application Priority Data

Jun. 29, 2015 (JP) ................................. 2015-129616
Dec. 18, 2015 (JP) ................................. 2015-246905

(51) Int. Cl.
H04N 1/409 (2006.01)

(52) U.S. Cl.
CPC ................................ *H04N 1/4092* (2013.01)

(58) Field of Classification Search
CPC ..................................................... H04N 1/58
See application file for complete search history.

(56) References Cited

U.S. PATENT DOCUMENTS

| | | | | |
|---|---|---|---|---|
| 5,091,967 A * | 2/1992 | Ohsawa | .................. | G06T 7/194 348/26 |
| 5,583,659 A * | 12/1996 | Lee | .................. | G06K 9/38 358/3.13 |
| 2002/0080377 A1* | 6/2002 | Tonami | .................. | H04N 1/4053 358/1.9 |
| 2004/0125411 A1* | 7/2004 | Tonanni Kazunari | ... | H04N 1/58 358/2.1 |
| 2006/0274162 A1* | 12/2006 | Fujishiro | .................. | G09G 3/3607 348/229.1 |
| 2008/0111998 A1* | 5/2008 | Edge | .................. | H04N 1/52 358/1.9 |
| 2009/0033962 A1* | 2/2009 | Ikari | .................. | H04N 1/506 358/1.9 |
| 2010/0231748 A1* | 9/2010 | Takeda | .................. | G03B 5/00 348/229.1 |
| 2010/0322536 A1* | 12/2010 | Tezuka | .................. | G06T 3/00 382/300 |
| 2013/0216137 A1* | 8/2013 | Washio | .................. | G06K 9/4604 382/199 |

FOREIGN PATENT DOCUMENTS

JP     2002-086805 A     3/2002

* cited by examiner

*Primary Examiner* — Ibrahim Siddo
(74) *Attorney, Agent, or Firm* — Canon USA, Inc., IP Division

(57) ABSTRACT

In an image processing apparatus for processing image data to be input, an edge image of which a pixel value changes between pixels is extracted from a generated drawing image of each color. Further, processing for expanding an edge amount is performed with respect to the extracted edge image, and brightness of a pixel of the drawing image corresponding to a pixel of the expanded edge image is adjusted based on the extracted edge amount.

15 Claims, 13 Drawing Sheets

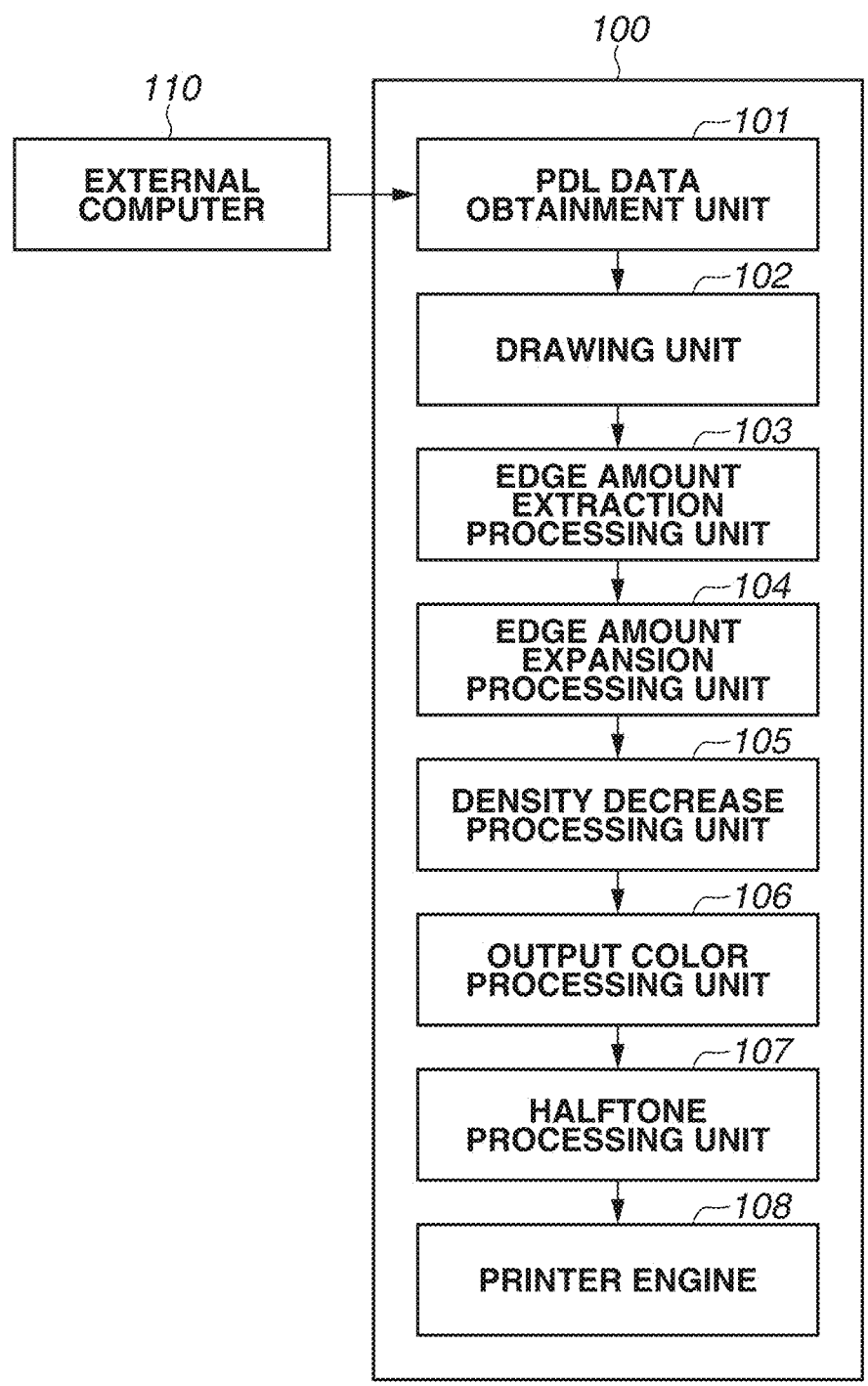

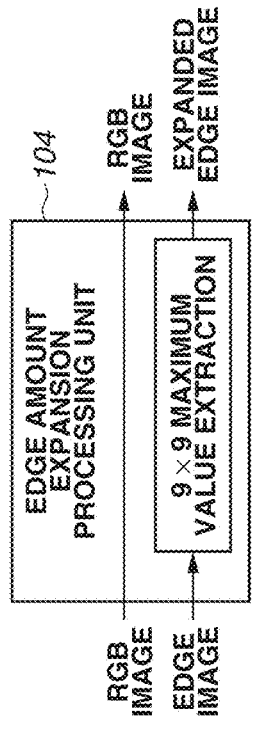
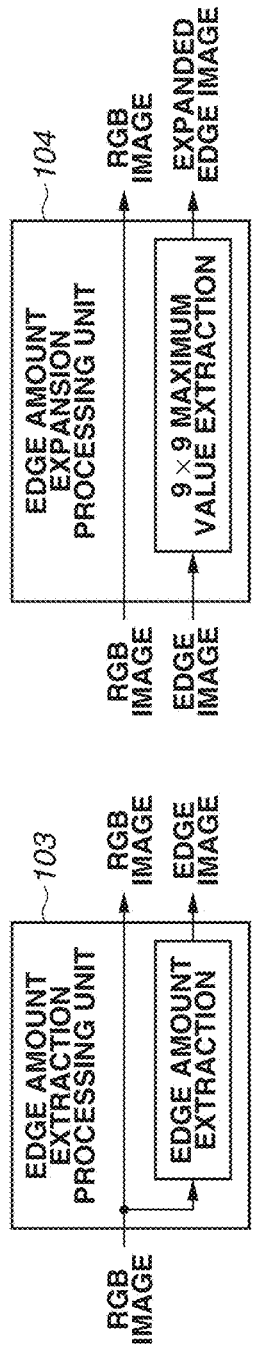
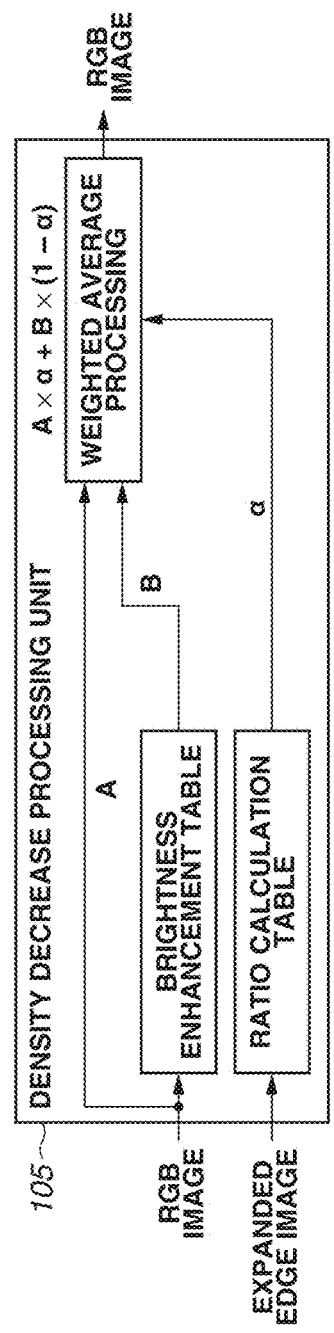
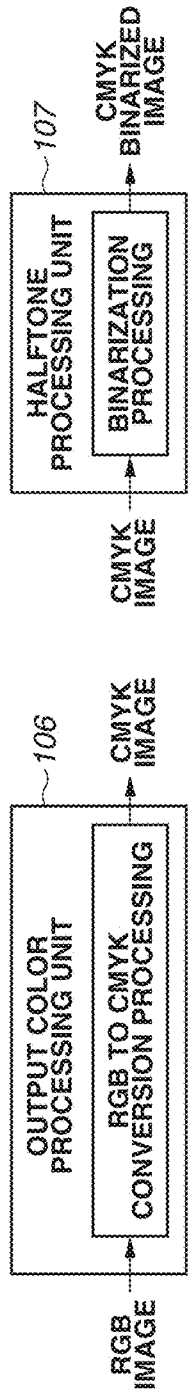

RGB = 224:224:224
RGB = 128:128:128
RGB = 0:0:0
RGB = 255:255:255

EDGE AMOUNT: 32
EDGE AMOUNT: 128
EDGE AMOUNT: 256
EDGE AMOUNT: 0

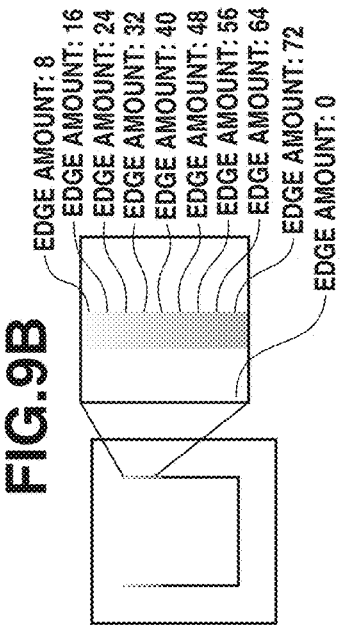

FIG.9A

RGB = 255:255:255
RGB = 247:247:247
RGB = 239:239:239
RGB = 231:231:231
RGB = 223:223:223
RGB = 215:215:215
RGB = 207:207:207
RGB = 199:199:199
RGB = 191:191:191

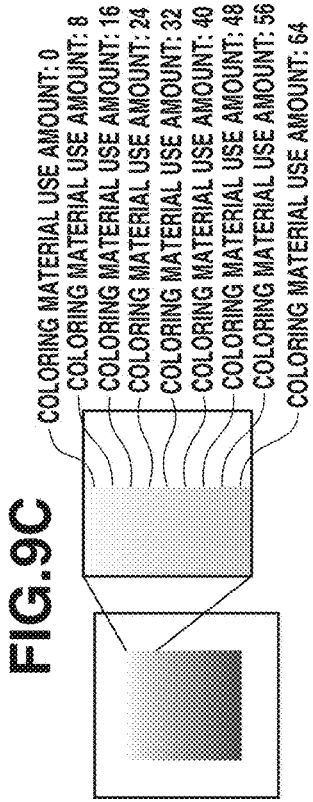

FIG.9B

EDGE AMOUNT: 8
EDGE AMOUNT: 16
EDGE AMOUNT: 24
EDGE AMOUNT: 32
EDGE AMOUNT: 40
EDGE AMOUNT: 48
EDGE AMOUNT: 56
EDGE AMOUNT: 64
EDGE AMOUNT: 72
EDGE AMOUNT: 0

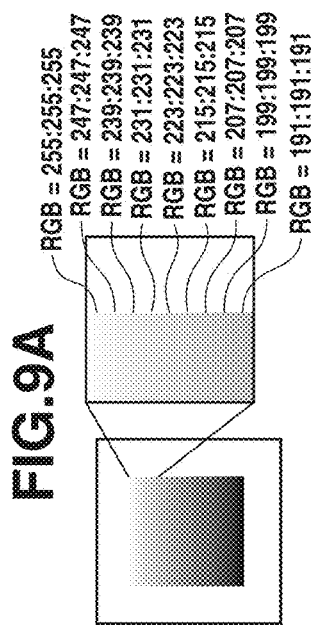

FIG.9C

COLORING MATERIAL USE AMOUNT: 0
COLORING MATERIAL USE AMOUNT: 8
COLORING MATERIAL USE AMOUNT: 16
COLORING MATERIAL USE AMOUNT: 24
COLORING MATERIAL USE AMOUNT: 32
COLORING MATERIAL USE AMOUNT: 40
COLORING MATERIAL USE AMOUNT: 48
COLORING MATERIAL USE AMOUNT: 56
COLORING MATERIAL USE AMOUNT: 64

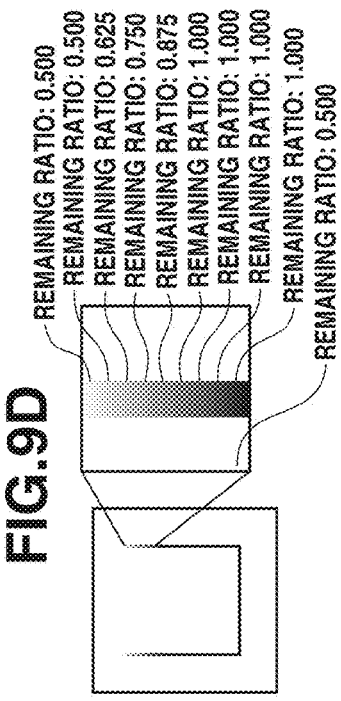

FIG.9D

REMAINING RATIO: 0.500
REMAINING RATIO: 0.500
REMAINING RATIO: 0.625
REMAINING RATIO: 0.750
REMAINING RATIO: 0.875
REMAINING RATIO: 1.000
REMAINING RATIO: 1.000
REMAINING RATIO: 1.000
REMAINING RATIO: 1.000
REMAINING RATIO: 0.500

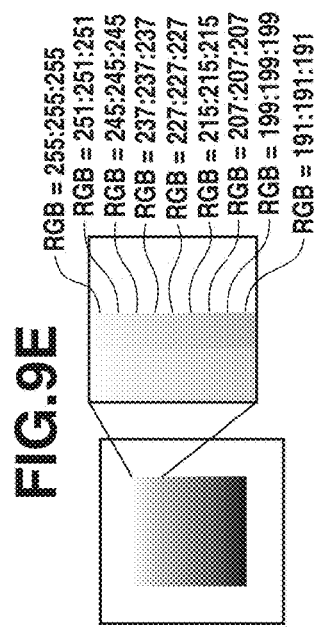

FIG.9E

RGB = 255:255:255
RGB = 251:251:251
RGB = 245:245:245
RGB = 237:237:237
RGB = 227:227:227
RGB = 215:215:215
RGB = 207:207:207
RGB = 199:199:199
RGB = 191:191:191

FIG.12A
| EDGE AMOUNT | COLORING MATERIAL USE AMOUNT BEFORE REDUCTION | REMAINING RATIO | COLORING MATERIAL USE AMOUNT AFTER REDUCTION |
|---|---|---|---|
| 0 | 946721110 | 0.500 | 473360555 |
| 1 | 1479634444 | 0.500 | 739817222 |
| ... | ... | ... | |
| 32 | 6000 | 0.750 | 4500 |
| 33 | 6600 | 0.760 | 5016 |
| ... | ... | ... | |
| 254 | 53292 | 1.000 | 53292 |
| 255 | 2264370 | 1.000 | 2264370 |
| TOTAL | 2435039424 | — | 1217519712 |
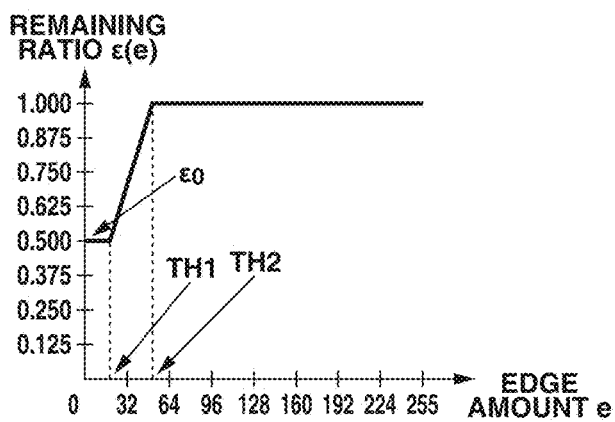
FIG.12B
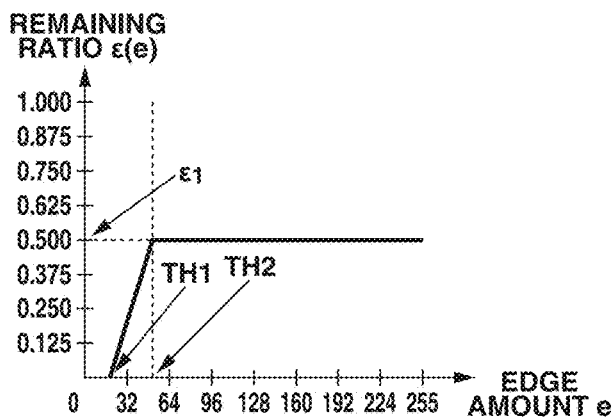
FIG.12C

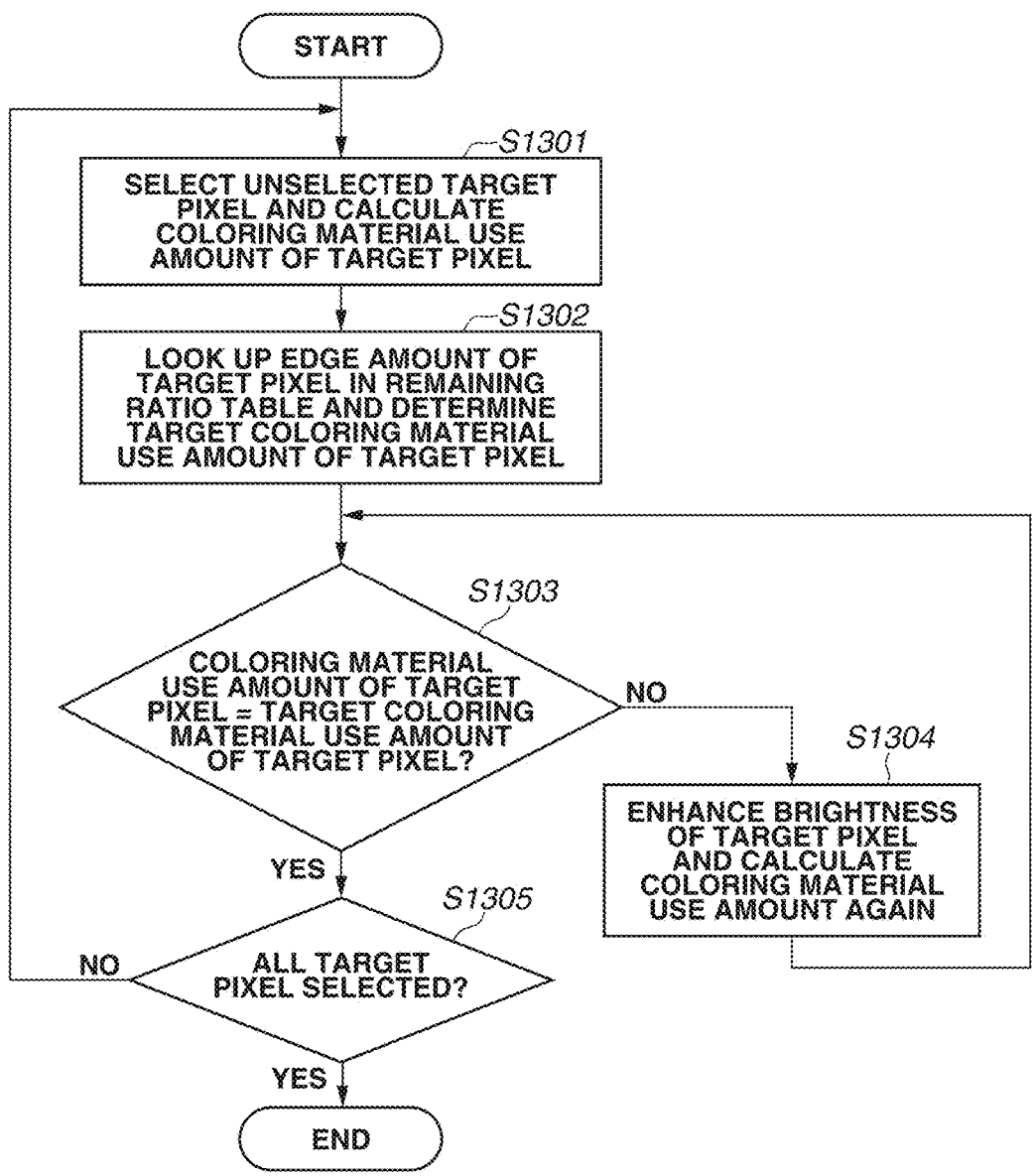

US 10,237,447 B2

IMAGE PROCESSING APPARATUS, IMAGE PROCESSING METHOD, AND STORAGE MEDIUM

BACKGROUND OF THE INVENTION

Field of the Invention

The present disclosure generally relates to image processing and, more particularly, to an image processing apparatus, an image processing method, and a storage medium.

Description of the Related Art

Processing (density decrease processing) has been known for determining each pixel of image data to be input as any one of an edge pixel and a non-edge pixel and applying coloring material amount reduction processing to the non-edge pixel (Japanese Patent Application Laid-Open No. 2002-086805).

The technique described in Japanese Patent Application Laid-Open No. 2002-086805 has an issue that the coloring material amount reduction processing is largely different between the pixel determined as the edge pixel and the pixel determined as the non-edge pixel, and thus a step due to switching of the relevant processing is noticeable in a print result between the pixel determined as the edge pixel and the pixel determined as the non-edge pixel.

The present disclosure is directed to the provision of a mechanism capable of reducing a step between pixels on edges extracted by image processing to solve the above-described issue.

SUMMARY OF THE INVENTION

An image processing apparatus according to the present disclosure for realizing the above-mentioned purpose includes following configuration.

An image processing apparatus for processing image data to be input includes a generation unit configured to generate a drawing image of each color from the image data, an extraction unit configured to extract an edge image of which a pixel value changes between pixels from the generated drawing image of each color, an edge amount expansion unit configured to perform processing for expanding an edge amount with respect to the extracted edge image, and a processing unit configured to adjust brightness of a pixel of the drawing image corresponding to a pixel of the expanded edge image based on the edge amount.

Further features of the present disclosure will become apparent from the following description of exemplary embodiments with reference to the attached drawings.

BRIEF DESCRIPTION OF THE DRAWINGS

FIG. 1 is a block diagram illustrating a configuration of an image processing apparatus.

FIGS. 2A to 2E are block diagrams each illustrating a configuration of each image processing mechanism.

FIGS. 9A to 9E are conceptual diagrams illustrating a density decrease processing unit of the image processing apparatus.

FIGS. 12A to 12C are a table and charts illustrating ratio determination processing by the density decrease processing unit.

FIG. 13 is a flowchart illustrating an image processing method of the image processing apparatus.

DESCRIPTION OF THE EMBODIMENTS

Figure 3A:
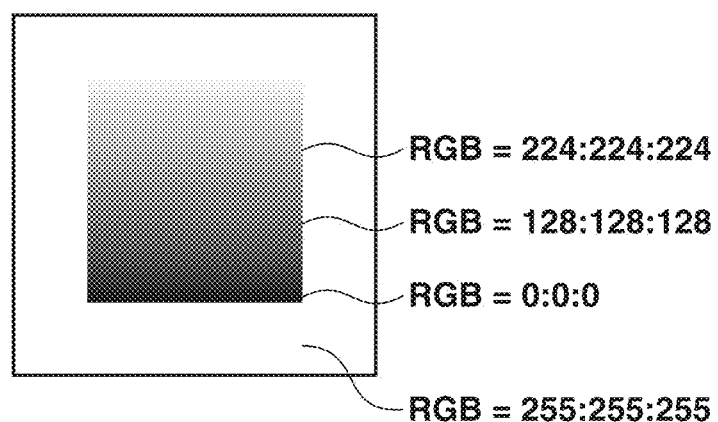
FIGS. 3A and 3B are conceptual diagrams illustrating details of processing by an edge amount extraction processing unit.

Various exemplary embodiments of the present disclosure will be described in detail below with reference to the attached drawings.

<Description of System Configuration>

FIG. 1 is a block diagram illustrating a configuration of an image processing apparatus according to a first exemplary embodiment.

In FIG. 1, an image processing apparatus 100 includes a page description language (PDL) data obtainment unit 101, a drawing unit 102, an edge amount extraction processing unit 103, an edge amount expansion processing unit 104, a density decrease processing unit 105, an output color processing unit 106, a halftone processing unit 107, and a printer engine 108. As used herein, the term "unit" generally refers to any combination of software, firmware, hardware, or other component, such as circuitry, that is used to effectuate a purpose.

The image processing apparatus 100 includes a central processing unit (CPU), which may include one or more processors, a read-only memory (ROM), and a random access RAM, which are not illustrated, therein. The CPU loads a program of the image processing apparatus 100 from the ROM and executes the program of the image processing apparatus 100 using the RAM as a primary storage area. According to the above-described operations, processing of each unit (101 to 108) is executed.

<PDL Data Obtainment Unit 101 and Drawing Unit 102>

When receiving PDL data from an external computer 110, the PDL data obtainment unit 101 outputs the PDL data to the drawing unit 102. The PDL data is data constituted of drawing commands of a plurality of objects. Next, the drawing unit 102 generates a drawing image (here, it is assumed as a red, green, and blue (RGB) image) based on the PDL data received from the PDL data obtainment unit 101 and outputs the drawing image to the edge amount extraction processing unit 103.

FIGS. 2A to 2E are block diagrams each illustrating a configuration of each image processing mechanism included in the image processing apparatus illustrated in FIG. 1.

FIG. 2A illustrates the image processing mechanism of the edge amount extraction processing unit 103 illustrated in FIG. 1. The edge amount extraction processing unit 103 receives the RGB image from the drawing unit 102, extracts an edge amount of each color (each plate) from the input RGB image data (hereinbelow, referred to as the RGB image), and generates an edge image from a maximum value of the edge amount extracted for each plate. An edge image is an image expressing a maximum value of an edge amount of each pixel in an RGB image, and as an example, the edge image has a bit depth of eight bits. Further, the edge amount extraction processing unit 103 outputs the RGB image and the edge image to the edge amount expansion processing unit 104.

FIG. 2B illustrates the image processing mechanism of the edge amount expansion processing unit 104 illustrated in FIG. 1. The edge amount expansion processing unit 104 receives the RGB image and the edge image from the edge amount extraction processing unit 103 and generates a maximum value of the edge amount in a range of about surrounding nine by nine pixels of each pixel in the edge image as an expanded edge image. Further, the edge amount expansion processing unit 104 outputs the RGB image and the expanded edge image to the density decrease processing unit 105.

FIG. 2C illustrates the image processing mechanism of the density decrease processing unit 105 illustrated in FIG. 1. The density decrease processing unit 105 receives the RGB image and the expanded edge image from the edge amount expansion processing unit 104 and performs the density decrease processing. The density decrease processing unit 105 calculates a value (B) by applying a brightness enhancement table to each pixel value (A) of the RGB image and calculates a value ($\alpha$: $0 \leq 3f\alpha \leq 1$) by applying a ratio calculation table to each pixel value of the expanded edge image. Next, the density decrease processing unit 105 performs weighted average processing by weighting the value A and the value B with the value $\alpha$. Accordingly, the density decrease processing unit 105 performs processing for changing the brightness on each pixel of the RGB image in such a manner that the density decrease processing unit 105 strongly applies processing for increasing brightness to a pixel of the expanded edge image of which a pixel value is small and weakly applies the processing to a pixel of the expanded edge image of which a pixel value is large. Further, the density decrease processing unit 105 outputs the changed RGB image and edge image to the output color processing unit 106.

FIG. 2D illustrates the image processing mechanism of the output color processing unit 106 illustrated in FIG. 1. The output color processing unit 106 receives the RGB image and the edge image from the density decrease processing unit 105, generates a cyan, magenta, yellow, and black (CMYK) image by performing color processing on the RGB image, and outputs the CMYK image (print data) to the halftone processing unit 107. As an example of the CMYK image generation, the output color processing unit 106 can perform the color processing using a color processing table for outputting a CMYK value corresponding to an input RGB value.

FIG. 2E illustrates the image processing mechanism of the halftone processing unit 107 and the printer engine 108 illustrated in FIG. 1. The halftone processing unit 107 converts the CMYK multivalued image received from the output color processing unit 106 to a CMYK binary image as a latent image of a coloring material of the printer engine 108 and outputs the CMYK binary image to the printer engine 108. Finally, the printer engine 108 forms each coloring material on an output medium, such as paper, based on the CMYK binary image received from the halftone processing unit 107.

Figure 3B:
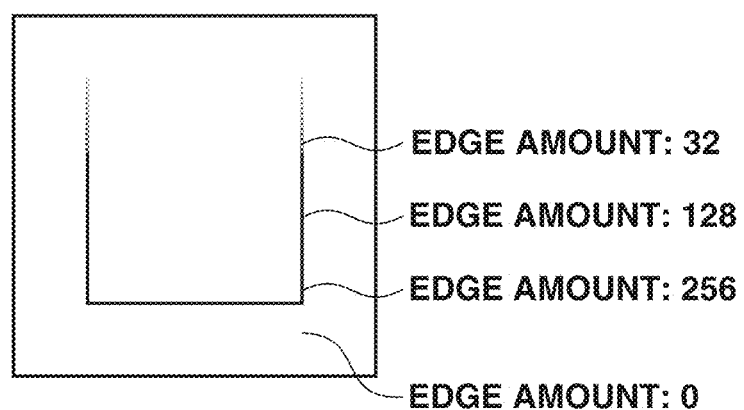

FIGS. 3A and 3B are conceptual diagrams illustrating details of processing by the edge amount extraction processing unit 103 illustrated in FIG. 1.

FIG. 3A conceptually illustrates an RGB image in which a quadrangular painted over a gradation shifting from white to black in a downward direction is drawn on a white background. FIG. 3B illustrates edge amounts of an edge image obtained as a result of the edge amount extraction performed on the RGB image. FIG. 3B conceptually illustrates that darker color has a larger edge amount. The edge amount extraction processing unit 103 determines the edge amount in such a manner that the edge amount becomes larger as a change (a step) of a pixel value between a target pixel and a surrounding pixel is larger, and the edge amount becomes smaller as a change (a step) of a pixel value between a target pixel and a surrounding pixel is smaller.

Figure 4:
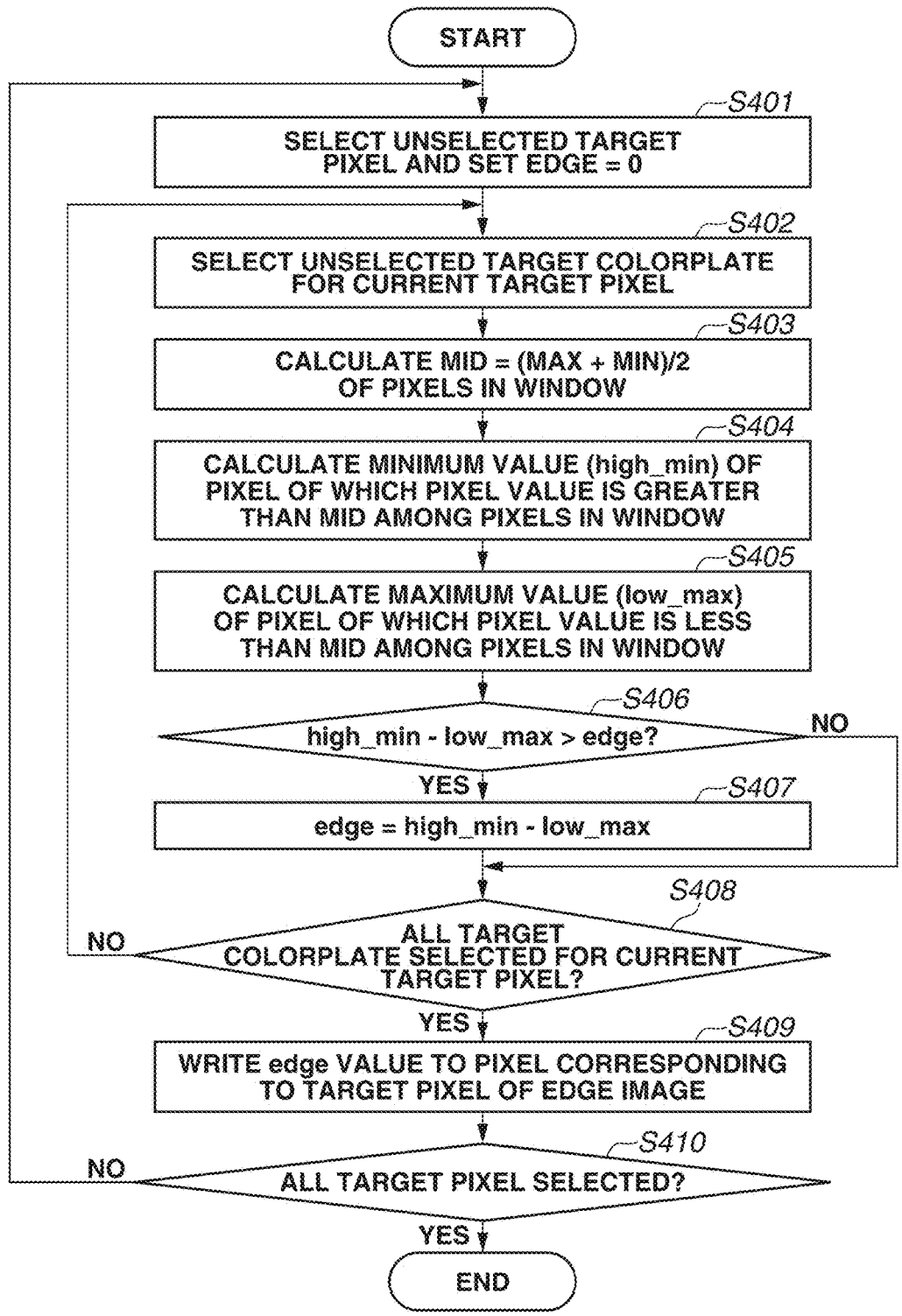
FIG. 4 is a flowchart illustrating an image processing method of the image processing apparatus.

FIG. 4 is a flowchart illustrating an image processing method of the image processing apparatus according to the present exemplary embodiment. This is an example of the image processing by the edge amount extraction processing unit 103 illustrated in FIG. 1. Each step is realized by the CPU included in the image processing apparatus 100 executing a stored control program. Hereinbelow, details of the image processing are described by mainly focusing on the modules illustrated in FIG. 1.

In step S401, the edge amount extraction processing unit 103 selects a pixel of the RGB image one by one from an upper left pixel as a target pixel and initializes an edge to "0" which is a variable for storing the edge amount to be calculated therein. Next, in step S402, the edge amount extraction processing unit 103 selects a target color plate for the current target pixel. Since the RGB image is processed here, the target color plate is any of R, G, and B. Next, in step S403, the edge amount extraction processing unit 103 detects a pixel having a maximum pixel value and a pixel having a minimum pixel value from pixels in a window (for example, a range of three by three pixels centering on the target pixel) and regards an average value of the two pixel values as mid.

Next, in step S404, the edge amount extraction processing unit 103 calculates a pixel value of a pixel having a minimum pixel value (high_min) among pixels of which pixel values are larger than the mid in the pixels in the window.

Similarly, in step S405, the edge amount extraction processing unit 103 calculates a pixel value of a pixel having a maximum pixel value (low_max) among pixels of which pixel values are less than the mid in the pixels in the window. A difference between high_min and low_max is an edge amount regarding the target color plate of the target pixel. In step S406, the edge amount extraction processing unit 103 determines whether the difference between high_min and low_max is larger than the pixel value of the edge image of the target pixel. If it is determined that the processing in step S406 is true (YES in step S406), then in step S407, the edge amount extraction processing unit 103 substitutes the difference between high_min and low_max for the edge, whereas if it is determined that the processing in step S406 is false (NO in step S406), substitution is not performed.

Next, in step S408, the edge amount extraction processing unit 103 determines whether all of the color plates are selected as the target color plate. If it is determined that all of the color plates are not selected (NO in step S408), then in step S402, the edge amount extraction processing unit 103 selects an unprocessed color plate. On the other hand, if it is determined that all of the color plates are selected (YES in step S408), then in step S409, the edge amount extraction processing unit 103 writes the value of the edge to a pixel corresponding to the target pixel of the edge image.

Next, in step S410, the edge amount extraction processing unit 103 determines whether all pixels are selected as the target pixel. If it is determined that all pixels are not selected (NO in step S410), then in step S401, the edge amount extraction processing unit 103 selects an unprocessed pixel.

The edge amount extraction processing unit 103 executes the above-described processing in step S401 to step S410 to all pixels, and thus extracts the edge amount for each plate with respect to the input RGB image and writes the maximum value of the edge amount extracted for each plate to the edge image.

The processing of the edge amount extraction processing unit 103 is not limited to the above-described example, and other known edge amount extraction processing such as the edge amount extraction by the Canny method and a space filter may be used.

<Details of Edge Amount Expansion Processing Unit>

Figure 5A:
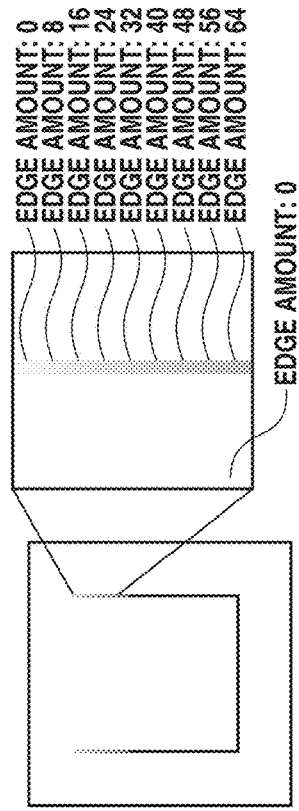
FIGS. 5A to 5C are block diagrams illustrating details of processing by an edge amount expansion processing unit.
Figure 5B:
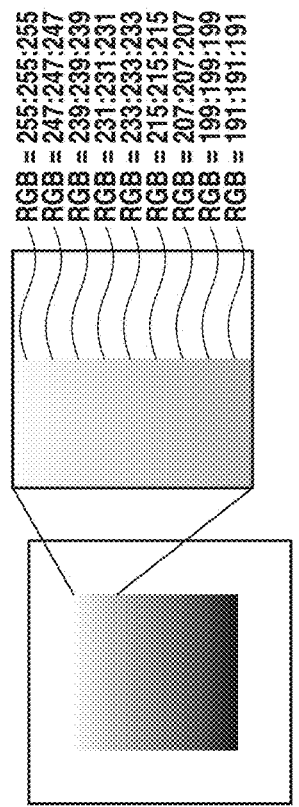
Figure 5C:
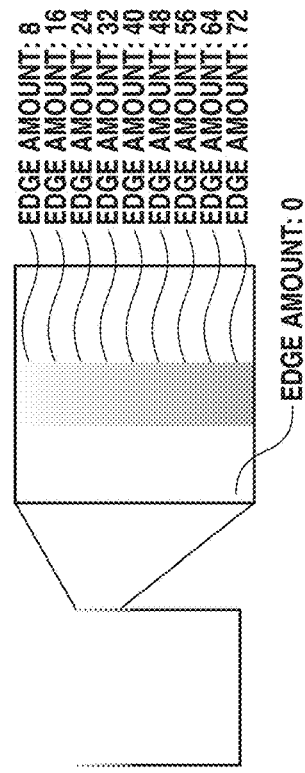

FIGS. 5A to 5C are block diagrams illustrating details of processing by the edge amount expansion processing unit 104 illustrated in FIG. 1.

FIG. 5A conceptually illustrates an RGB image in which a quadrangular painted over a gradation shifting from white to black in a downward direction is drawn on a white background. A right side of FIG. 5A illustrates a state in which a portion of the RGB image is enlarged.

FIG. 5B illustrates edge amounts of an edge image obtained as a result of the processing performed on the image in FIG. 5A by the edge amount extraction processing unit 103 and conceptually illustrates that darker color has a larger edge amount.

FIG. 5C illustrates expanded edge amounts of the edge image. The edge amount expansion processing unit 104 writes the maximum value of the surrounding edge amounts of each pixel with respect to the received edge image to an expanded edge amount of a corresponding pixel of the edge image. Accordingly, the edge amount expansion processing unit 104 can adjust a thickness of an edge remained by the density decrease processing unit 105. In addition, the expanded edge amount can be determined in such a manner that the expanded edge amount becomes larger as a change of the pixel value of the surrounding pixel is larger, and the expanded edge amount becomes smaller as a change of the pixel value of the surrounding pixel is smaller.

<Details of Edge Amount Expansion Processing Unit>

Figure 6:
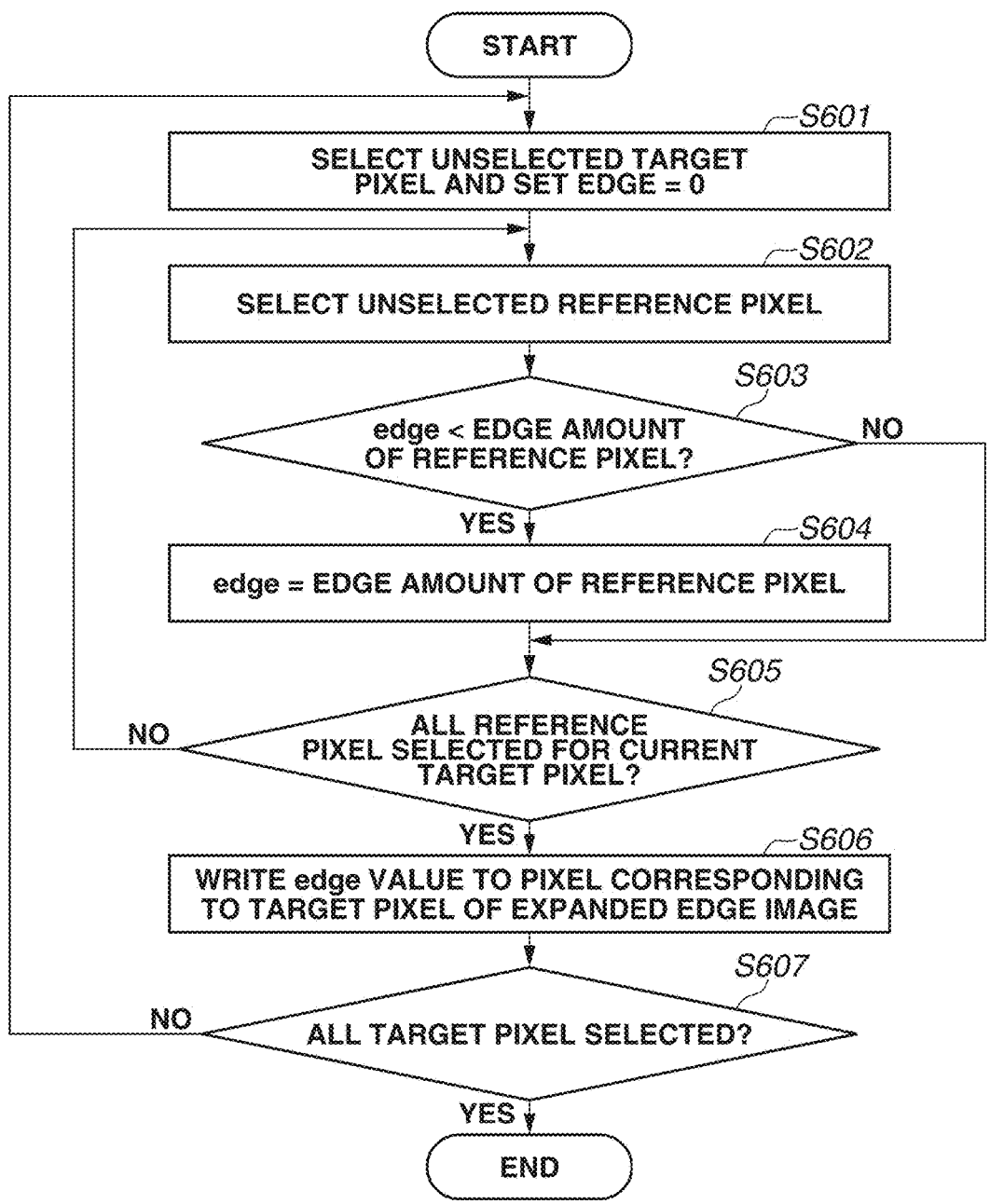
FIG. 6 is a flowchart illustrating an image processing method of the image processing apparatus.

FIG. 6 is a flowchart illustrating an image processing method of the image processing apparatus according to the present exemplary embodiment. This is an example of the image processing by the edge amount expansion processing unit 104 illustrated in FIG. 1. Each step is realized by the CPU included in the image processing apparatus 100 executing a stored control program. Hereinbelow, details of the image processing are described by mainly focusing on the modules illustrated in FIG. 1.

In step S601, the edge amount expansion processing unit 104 selects a pixel one by one from an upper left pixel as a target pixel and initializes an edge to zero which is a variable for storing the expanded edge amount to be calculated therein.

Next, in step S602, the edge amount expansion processing unit 104 selects a pixel in the window (for example, a range of nine by nine pixels centering on the target pixel) one by one from an upper left pixel as a reference pixel. Next, in step S603, the edge amount expansion processing unit 104 determines whether the edge is smaller than an edge amount of the reference pixel. If it is determined that the processing in step S603 is true (YES in step S603), then in step S604, the edge amount expansion processing unit 104 substitutes the edge amount of the reference pixel for the edge. On the other hand, if it is determined that the processing in step S603 is false (NO in step S603), substitution is not performed.

Next, in step S605, the edge amount expansion processing unit 104 determines whether all of the reference pixels are referred from the window of nine by nine pixels with respect to the current target pixel. If it is determined that all of the reference pixels are not selected (NO in step S605), then in step S602, the edge amount expansion processing unit 104 selects an unprocessed reference pixel.

On the other hand, if it is determined that all of the reference pixels are selected (YES in step S605), then in step S606, the edge amount expansion processing unit 104 writes the value of the edge to a pixel corresponding to the target pixel of the expanded edge image. In step S607, the edge amount expansion processing unit 104 determines whether all pixels are selected as the target pixel. If it is determined that all pixels are not selected (NO in step S607), then in step S601, the edge amount expansion processing unit 104 selects an unprocessed pixel. The edge amount expansion processing unit 104 executes the above-described processing in step S601 to step S607 to all pixels, and thus performs the edge amount expansion processing on the input edge image.

The processing of the edge amount expansion processing unit 104 is not limited to the above-described example, and processing for calculating an average value of the edge amounts and a second largest edge amount in the window and the like may be performed.

Hereinbelow, the density decrease processing unit 105 strongly applies the processing for increasing brightness to the RGB image as the expanded edge amount of the edge image is smaller and weakly applies the processing for increasing brightness to the RGB image as the expanded edge amount of the edge image is larger with respect to each pixel.

More specifically, the weighted average processing is performed on the RGB image subjected to the processing for increasing brightness and the input RGB image at a ratio according to the expanded edge amount. Accordingly, the density decrease processing can be realized in which a coloring material amount reduction ratio is continuously adjusted to make the coloring material amount reduction ratio large in a pixel of which the edge amount is small and make the coloring material amount reduction ratio small in a pixel of which the edge amount is large.

FIGS. 7A to 7E are conceptual diagrams illustrating details of processing by the density decrease processing unit 105 illustrated in FIG. 1.

Figure 7A:
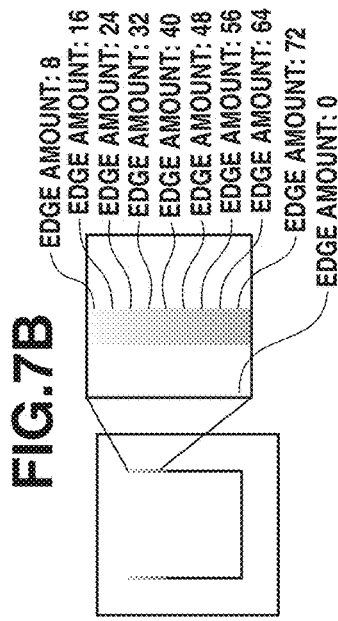
FIGS. 7A to 7E illustrate edge processing states of the image processing apparatus.

FIG. 7A conceptually illustrates an RGB image in which a quadrangular painted over a gradation shifting from white to black in a downward direction is drawn on a white background, and a right side of FIG. 7A illustrates a state in which a portion of the RGB image is enlarged.

Figure 7B:
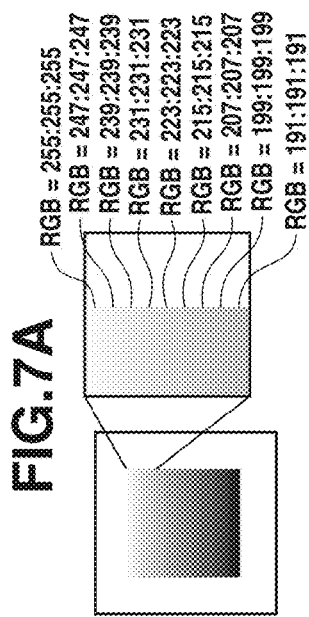

FIG. 7B illustrates expanded edge amounts of the edge image obtained as a result of the processing performed on the image in FIG. 7A by the edge amount extraction processing unit 103 and the edge amount expansion processing unit 104 and an enlarged view thereof and conceptually illustrates that darker color has a larger expanded edge amount.

Figure 7C:
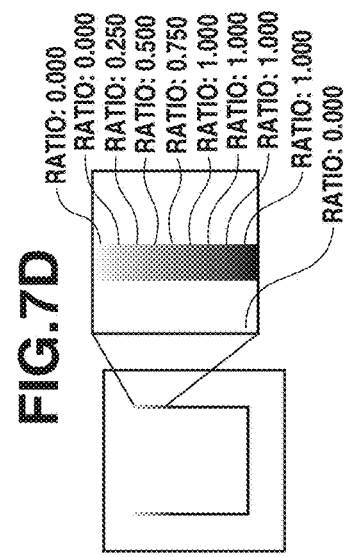
Figure 8A:
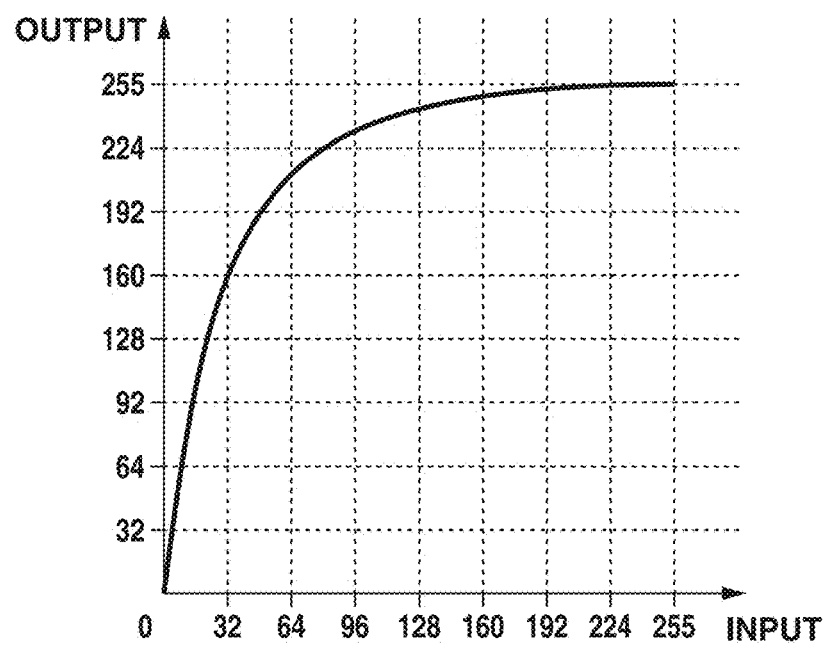
FIGS. 8A and 8B are characteristic charts illustrating an edge processing state of the image processing apparatus.
Figure 8B:
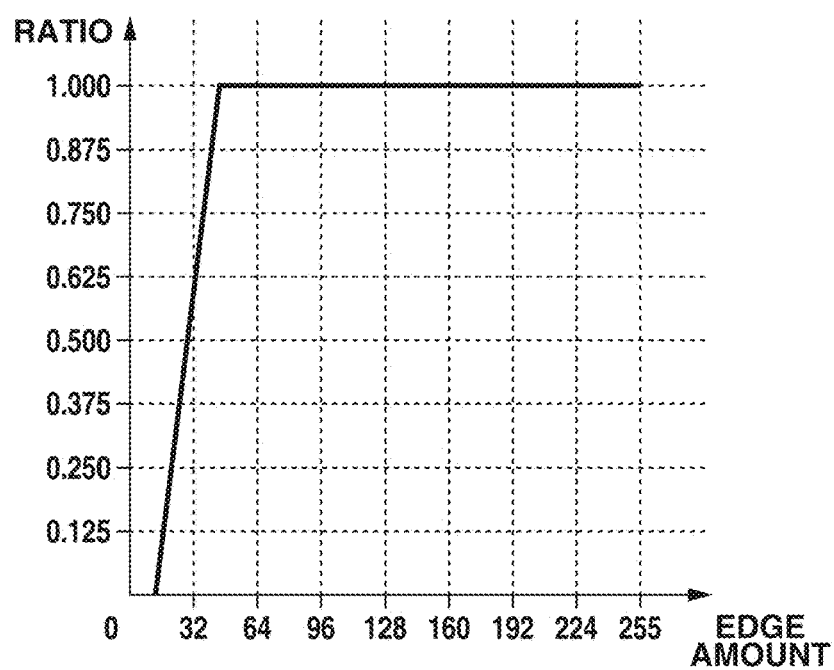

FIG. 7C illustrates an image obtained by performing the processing for increasing brightness on pixel values of the respective color plates of the RGB image using a brightness conversion table illustrates in FIG. 8A. In the example in FIG. 7C, when a pixel of RGB=191:191:191 is input, a pixel of RGB=247:247:247 is output by applying the table in FIG. 8A. The processing is performed independently on the respective color plates of the RGB image, and thus, as another example, when a pixel of RGB=64:128:192 is input, a pixel of RGB=208:240:248 is output.

Figure 7D:
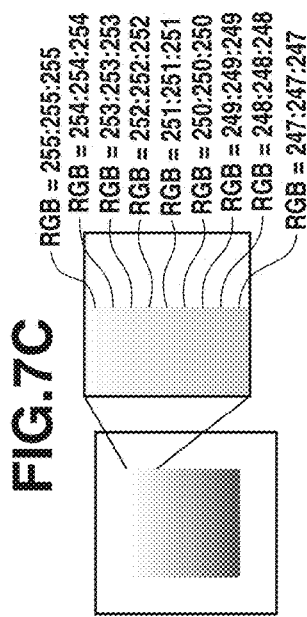
Figure 7E:
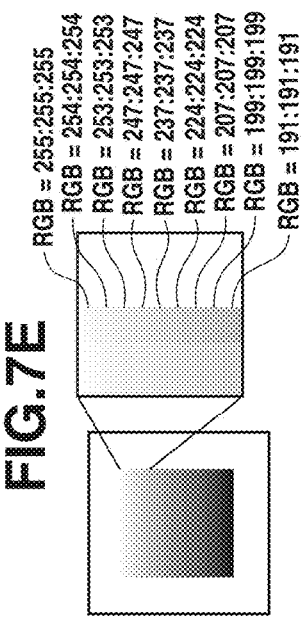

FIG. 7D illustrates ratios of the weighted average processing of the brightness-increased RGB image based on the expanded edge amount in FIG. 7B. A pixel of which the ratio is 1.000 outputs a pixel value of an input RGB image. A pixel of which the ratio is 0.500 outputs a pixel value obtained by mixing the respective pixel values of the input RGB image and the brightness-increased RGB image half and half. A pixel of which the ratio is 0.000 outputs a pixel value of the brightness-increased RGB image. FIG. 7E illustrates the result. It can be understood that the density decrease processing is realized in which a step due to switching of the coloring material amount reduction processing is unnoticeable.

According to the present exemplary embodiment, the edge amount expansion processing unit 104 may be skipped in a case where a sufficiently thick edge can be extracted or it is wanted to leave a thin edge by the processing of the edge amount extraction processing unit 103. In such a case, the expanded edge amount is not necessary in a data structure of the edge image illustrated in FIGS. 2A to 2E, and the density decrease processing unit 105 performs processing according to not the expanded edge amount but the edge amount of the edge image.

According to the first exemplary embodiment, the processing for increasing brightness is continuously performed in such a manner that the processing for increasing brightness is strongly applied to a pixel of which the edge amount subjected to the image processing is small and the processing for increasing brightness is weakly applied to a pixel of which the edge amount is large. When the brightness is increased, the density is decreased, and a coloring material use amount is reduced.

According to the first exemplary embodiment, the density decrease processing is performed by the density decrease processing unit 105 prior to the output color processing unit 106, so that the coloring material use amount is reduced by changing the brightness.

In contrast, according to a second exemplary embodiment, the density decrease processing unit 105 is disposed between the output color processing unit 106 and the halftone processing unit 107, so that the density decrease processing unit 105 decreases pixel values of a CMYK image and the coloring material use amount can be reduced.

In this case, the weighted average processing is performed on a CMYK image of which coloring material is restricted and the input CMYK image at a ratio determined according to the expanded edge amount. In this case, the edge amount extraction processing unit 103 and the edge amount expansion processing unit 104 may be also disposed behind the output color processing unit 106. According to the present exemplary embodiment, the coloring material amount is continuously reduced in such a manner that the coloring material amount reduction ratio is high in a pixel of which the edge amount is small and the coloring material amount reduction ratio is low in a pixel of which the edge amount is large. In addition, since the coloring material amount reduction ratio is continuously changed according to the edge amount, the density decrease processing can be realized in which a step due to switching of the processing is unnoticeable.

According to a third exemplary embodiment, the density decrease processing unit 105 according to the first exemplary embodiment is expanded. A strength of reduction processing of each edge amount which is fixedly determined in the first exemplary embodiment is dynamically determined, and processing for changing brightness for each pixel is replaced with processing for changing the coloring material use amount to a target amount. Accordingly, the coloring material use amount is restricted so as to be a target coloring material use amount when the RGB image is output from the printer engine 108 via the output color processing unit 106 and the halftone processing unit 107.

<Details of Density Decrease Processing Unit 105>

FIGS. 9A to 9E are conceptual diagrams illustrating details of processing by the density decrease processing unit 105 illustrated in FIG. 1. Here, a case is described as an example in which a target value is input so that the density decrease processing unit 105 reduces the coloring material use amount by half.

FIG. 9A conceptually illustrates an RGB image in which a quadrangular painted over a gradation shifting from white to black in a downward direction is drawn on a white background, and a right side of FIG. 9A illustrates a state in which a portion of the RGB image is enlarged.

FIG. 9B illustrates expanded edge amounts of the edge image obtained as a result of the processing performed on the image in FIG. 9A by the edge amount extraction processing unit 103 and the edge amount expansion processing unit 104 and an enlarged view thereof. FIG. 9B conceptually illustrates that darker color has a larger expanded edge amount.

FIG. 9C illustrates coloring material use amounts calculated for each pixel with respect to the RGB image and conceptually illustrates that as the darker color has a larger coloring material use amount. As a calculation method for the coloring material use amount of each pixel, conversion used by the output color processing unit 106 when generating a CMYK image from an RGB image is performed and a sum of the CMYK values may be regarded as the coloring material use amount.

These values are gathered by each edge amount, and a coloring material use amount table of each edge amount is generated which is indicated in first and second columns in FIG. 12A. Further, a remaining ratio in a third column is determined by remaining ratio determination processing of the coloring material of each edge amount which is described below. Accordingly, the target value is given as a total sum of the coloring material use amount after reduction (a bottom line of a fourth column). The remaining ratio of the coloring material at this time is in a stepwise shape as a chart illustrated in FIG. 12B. Thus, the coloring material amount reduction ratio is continuously changed according to the edge amount, and the density decrease processing can be realized in which a step due to switching of the processing is unnoticeable.

FIG. 9D illustrates the remaining ratios of the coloring material which is calculated and determined for each pixel with respect to the RGB image and conceptually illustrates that as the darker color has the higher remaining ratio of the coloring material.

FIG. 9E illustrates an image obtained by performing the brightness enhancement processing on the RGB image so as to reduce the coloring material use amount using the remaining ratio of the coloring material illustrated in FIG. 9D. The processing is described in detail below.

<Details of Density Decrease Processing Unit 105>

Figure 10:
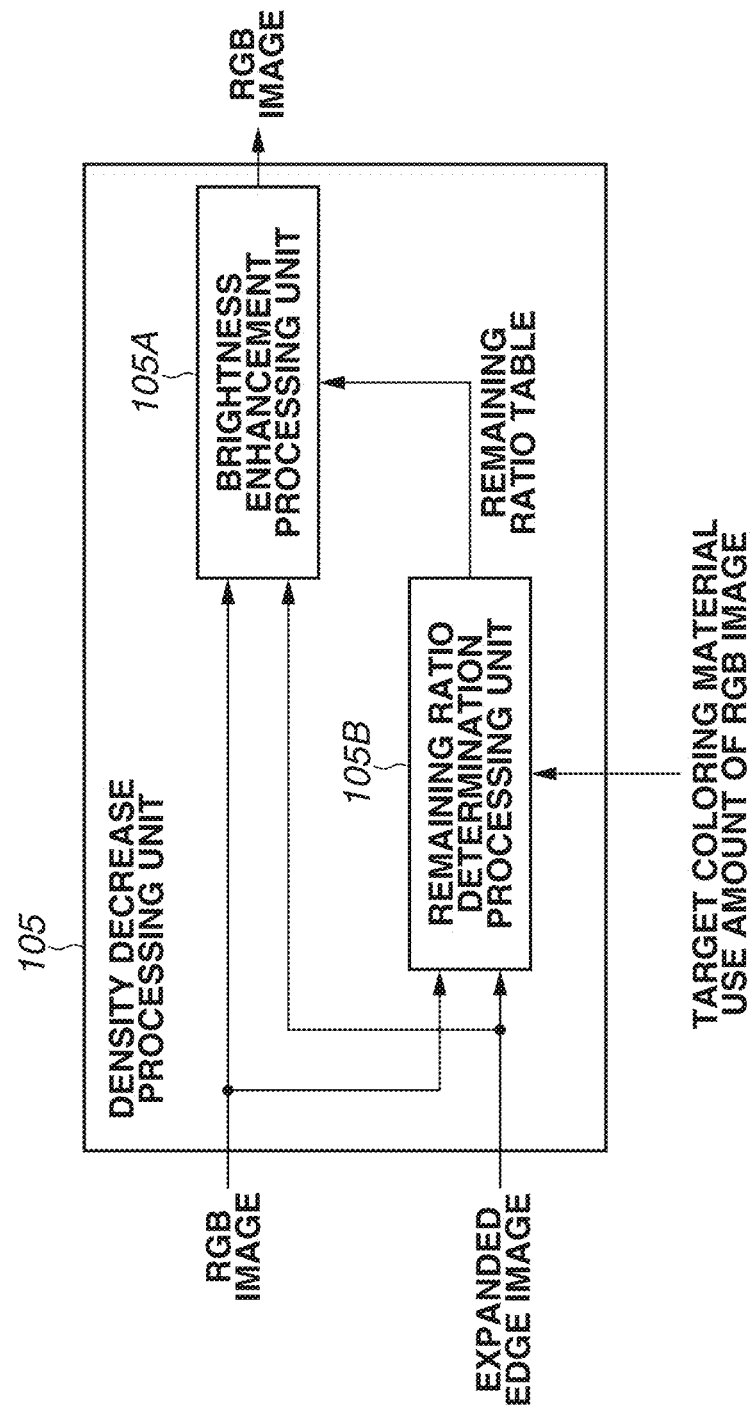
FIG. 10 is a block diagram illustrating a detail configuration of the density decrease processing unit.

FIG. 10 is a block diagram illustrating a detail configuration of the density decrease processing unit 105.

In FIG. 10, the density decrease processing unit 105 is constituted of a brightness enhancement processing unit 105A and a remaining ratio determination processing unit 105B.

The remaining ratio determination processing unit 105B receives a target coloring material use amount of the RGB image together with the RGB image and the expanded edge image, generates a remaining ratio table, and outputs the table to the brightness enhancement processing unit 105A. The target coloring material use amount of the RGB image is a target value of the coloring material use amount of the RGB image which is a fixed value or specified from a user interface, which is not illustrated, included in the image processing apparatus 100 and the external computer 110.

The remaining ratio table indicates a ratio of how much the coloring material is remained for each edge amount of a pixel. For example, when the expanded edge image has a bit depth of eight bits, the expanded edge image is an array including 256 elements. When the remaining ratio is 0%, the coloring material is not remained, when the remaining ratio is 100%, the coloring material is completely remained, and when, for example, the remaining ratio is 50%, as a middle therebetween, the coloring material is remained by half.

Next, the brightness enhancement processing unit 105A receives the remaining ratio table together with the RGB image and the expanded edge image, controls the coloring material use amount by increasing brightness for each pixel, and outputs the RGB image as a result thereof. Details of these two types of processing are described below.

Figure 11:
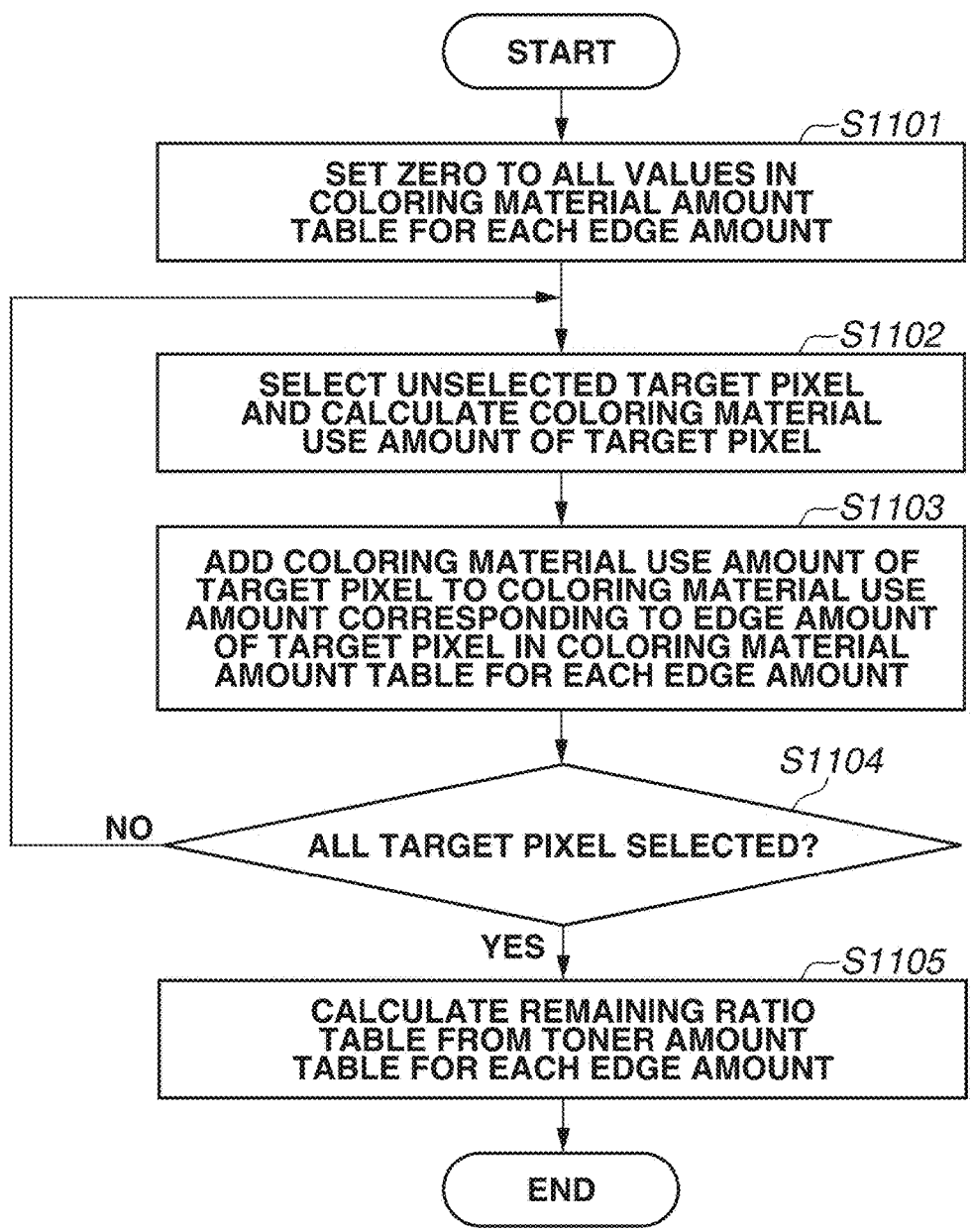
FIG. 11 is a flowchart illustrating an image processing method of the image processing apparatus.

FIG. 11 is a flowchart illustrating an image processing method of the image processing apparatus according to the present exemplary embodiment. This is an example of the processing by the remaining ratio determination processing unit 105B illustrated in FIG. 10. Each step is realized by the CPU included in the image processing apparatus 100 executing a stored control program.

First, in step S1101, the density decrease processing unit 105 initializes the coloring material amount table of each edge amount to all "0". The coloring material amount table of each edge amount is generated by gathering a total sum of the coloring material use amounts of the input RGB image for each edge amount. For example, when the expanded edge image has a bit depth of eight bits, the expanded edge image is an array including 256 elements. Next, in step S1102, the density decrease processing unit 105 selects a pixel one by one from an upper left pixel as a target pixel and calculates the coloring material use amount of the target pixel. In step S1103, the density decrease processing unit 105 adds the coloring material use amount of the target pixel to the coloring material use amount corresponding to the edge amount of the target pixel in the coloring material amount table of each edge amount. Next, in step S1104, the density decrease processing unit 105 determines whether all pixels are selected as the target pixel. If it is determined that all pixels are not selected (NO in step S1104), then in step S1102, the density decrease processing unit 105 selects an unprocessed target pixel.

On the other hand, the density decrease processing unit 105 determines that all pixels are selected (YES in step S1104), then in step S1105, the density decrease processing unit 105 calculates the remaining ratio table from the coloring material amount table of each edge amount and the target coloring material use amount of the RGB image.

A following method can be cited as an example of a method for calculating the remaining ratio table from the coloring material use amount table before reduction of each edge amount of the first and second columns in FIG. 12A. When a coloring material remaining ratio ε(e) of each edge amount for reducing the coloring material use amount by half has a shape in FIG. 12B, the remaining ratio of when the edge amount is "0" is denoted as $\varepsilon_0$, and points at which a line in the chart is turned are denoted as TH1 and TH2, the coloring material remaining ratio ε(e) is expressed by Equation 1.

$$\begin{cases} \varepsilon(e) = \varepsilon_0 & 0 \le e < TH_1 \\ \varepsilon(e) = \frac{1-\varepsilon_0}{TH_2 - TH_1}e + \frac{TH_2\varepsilon_0 - TH_1}{TH_2 - TH_1} & TH_1 \le e < TH_2 \\ \varepsilon(e) = 1 & TH_2 \le e \le 255 \end{cases} \quad \text{[Equation 1]}$$

Further, the coloring material use amount before processing of each edge amount indicated in the second column in FIG. 12A is denoted as u(e), and the coloring material use amount before processing indicated in the bottom line of the second column in FIG. 12A is denoted as $U_{all}$. When the target coloring material use amount of the RGB image obtained by the density decrease processing unit 105 is denoted as $U_{target}$, the remaining ratio $\varepsilon_0$ when the edge amount is "0" is expressed by Equation 2.

$$\varepsilon_0 = 1 - \frac{U_{all} - U_{target}}{\sum_{e=0}^{TH_1-1} u(e) + \sum_{e=TH_1}^{TH_2-1} u(e)\left(\frac{TH_2 - e}{TH_2 - TH_1}\right)} \quad \text{[Equation 2]}$$

When TH1 and TH2 are predetermined values, u(e) and $U_{all}$ are values determined from the RGB image, and $U_{target}$ is a value separately specified by the density decrease processing unit 105, so that the remaining ratio $\varepsilon_0$ when the edge amount is "0" is uniquely determined.

When a value of the remaining ratio $\varepsilon_0$ is "0" or greater, the remaining ratio table can be determined as expressed in Equation 1 by regarding the remaining ratio ε(e) as the remaining ratio of each edge amount. In this regard, the coloring material use amount after reduction coincides with the coloring material use amount after reduction indicated in the bottom line of the fourth column in FIG. 12A.

A case in which the remaining ratio $\varepsilon_0$ is less than "0" is a case when the target coloring material use amount of the RGB image is not reached by the relevant generation method of the remaining ratio table. In this case, although visibility of the edge is deteriorated, the target coloring material use amount of the RGB image can be reached by lightening the edge portion. For example, as illustrated in FIG. 12C, when $\varepsilon_c = 0$ and further the remaining ratio ε(e) is set to a smaller value in whole, the target coloring material use amount of the RGB image can be realized. The remaining ratio ε(e) when a shape thereof is that in FIG. 12C can be determined as expressed by Equation 3.

$$\begin{cases} \varepsilon(e) = 0 & 0 \le e < TH_1 \\ \varepsilon(e) = \frac{1}{TH_2 - TH_1}e - \frac{TH_1}{TH_2 - TH_1} & TH_1 \le e < TH_2 \\ \varepsilon(e) = \varepsilon_1 & TH_2 \le e \le 255 \end{cases} \quad \text{[Equation 3]}$$

$$\varepsilon_1 = \frac{U_{target}}{\sum_{e=TH_1}^{TH_2-1} u(e)\left(\frac{e - TH_1}{TH_2 - TH_1}\right) + \sum_{e=TH_2}^{255} u(e)}$$

When the remaining ratio $\varepsilon_c$ is less than "0", and the visibility of the edge is prioritized than that the coloring material use amount becomes the target value, Equation 1 may be used by setting $\varepsilon_0=0$, although the target coloring material use amount of the RGB image is not reached. Further, processing for changing the target coloring material use amount of the RGB image and the like may be performed.

FIG. 13 is a flowchart illustrating an image processing method of the image processing apparatus according to the present exemplary embodiment. This is an example of the processing by the brightness enhancement processing unit 105A illustrated in FIG. 10. Each step is realized by the CPU included in the image processing apparatus 100 executing a stored control program.

First, in step S1301, the density decrease processing unit 105 selects a pixel one by one from an upper left pixel as a target pixel and calculates the coloring material use amount of the target pixel. In step S1302, the density decrease processing unit 105 determines a target coloring material amount of the target pixel from the remaining ratio corresponding to the edge amount of the target pixel in the remaining ratio table.

Next, in step S1303, the density decrease processing unit 105 determines whether the coloring material use amount of the target pixel is the target coloring material use amount of the target pixel or less. If it is determined that the processing in step S1303 is false (NO in step S1303), then in step S1304, the density decrease processing unit 105 slightly increases the brightness of the target pixel, calculates the coloring material use amount again, and returns the processing to step S1303.

As an example of a method for increasing a brightness value, the coloring material use amount is calculated again using $255*\alpha+R*(1-\alpha)$, $255*\alpha+G*(1-\alpha)$, and $255*\alpha+B*(1-\alpha)$, $(0<\alpha<1)$ by gradually increasing a value of a with respect to each signal value of an RGB image, and then the processing proceeds to step S1303.

The processing in steps S1303 and S1304 is repeated, and thus the coloring material use amount of the target pixel can be the target coloring material use amount by only changing the brightness of the target pixel. It is because that when the brightness of the target pixel is increased, the coloring material use amount is decreased.

As a method for increasing a brightness value, the pixel value of the RGB image may be converted to another color space such as a YUV color space to increase the brightness and then returned to the pixel value of the RGB image. The iterative operation may be replaced with a binary tree method, a cache of a processing result, and the like.

In this regard, when the target pixel has a discrete value, there is a possibility that the coloring material use amount of the target pixel will not completely coincide with the target coloring material amount of the target pixel. Thus, the condition in step S1303 may be set as that whether the coloring material use amount of the target pixel is the target coloring material use amount of the target pixel or less, or whether a difference between the coloring material use amount of the target pixel and the target coloring material use amount of the target pixel is less than a predetermined threshold value.

Finally, in step S1305, the density decrease processing unit 105 determines whether all pixels are selected. If it is determined that all pixels are not selected (NO in step S1305), the density decrease processing unit 105 returns the processing to step S1301 and selects an unprocessed target pixel.

On the other hand, if the density decrease processing unit 105 determines that all pixels are selected (YES in step S1305), the processing in the present flowchart is terminated.

According to the present exemplary embodiment, the coloring material use amount is reduced while being continuously controlled in such a manner that the coloring material amount reduction ratio is high in a pixel of which the edge amount is small and the coloring material amount reduction ratio is low in a pixel of which the edge amount is large so as to be the target coloring material use amount. In addition, since the coloring material amount reduction ratio is continuously changed according to the edge amount, the density decrease processing can be realized in which a step due to switching of the processing is unnoticeable while controlling the coloring material use amount.

According to the third exemplary embodiment, the density decrease processing is performed by the density decrease processing unit 105 prior to the output color processing unit 106 as with the case of the first exemplary embodiment, and thus the coloring material use amount is reduced by changing the brightness.

In contrast, according to a fourth exemplary embodiment, the density decrease processing unit 105 is disposed between the output color processing unit 106 and the halftone processing unit 107 as with the case of the second exemplary embodiment, and thus the density decrease processing unit 105 can controls and reduces the coloring material use amount by lowering pixel values of a CMYK image.

In this case, the density decrease processing unit 105 controls the coloring material amount of the target pixel of the CMYK image in step S1304 in FIG. 13 and brings the coloring material use amount to the target coloring material amount. In this case, the edge amount extraction processing unit 103 and the edge amount expansion processing unit 104 may be also disposed behind the output color processing unit 106.

According to the present exemplary embodiment, the coloring material use amount is reduced while being continuously controlled in such a manner that the coloring material amount reduction ratio is high in a pixel of which the edge amount is small and the coloring material amount reduction ratio is low in a pixel of which the edge amount is large so as to be the target coloring material use amount. In addition, since the coloring material amount reduction ratio is continuously changed according to the edge amount, the density decrease processing can be realized in which a step due to switching of the processing is unnoticeable while controlling the coloring material use amount.

According to the present disclosure, a step between pixels due to an edge extracted by image processing can be reduced.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2015-129616, filed Jun. 29, 2015, and Japanese Patent Application No. 2015-246905, filed Dec. 18, 2015, each of which are hereby incorporated by reference herein in their entirety.

What is claimed is:

1. An image processing apparatus for processing inputted image data, the image processing apparatus comprising:
one or more memories storing instructions; and
one or more processors that, when executing the instructions, causes the image processing apparatus to:
extract edge intensity of a target pixel included in the inputted image data on a basis of the target pixel and surrounding pixels around the target pixel; and
perform conversion processing of converting a pixel value of the target pixel such that brightness of the target pixel becomes greater than brightness of the target pixel before conversion at least in accordance with the extracted edge intensity of the target pixel and the pixel value of the target pixel,
wherein, in the conversion processing, in a case where the pixel value of the target pixel is a first pixel value, the brightness of the target pixel after conversion differs depending on a value of the edge intensity of the target pixel, a ratio of increase in the brightness of the target pixel after conversion from the brightness of the target pixel before conversion decreases as the edge intensity of the target pixel increases, and the ratio of increase in the brightness of the target pixel after conversion from the brightness of the target pixel before conversion increases as the edge intensity of the target pixel decreases, and
wherein, after completion of the conversion processing, an image after the conversion processing is outputted.

2. The image processing apparatus according to claim 1, wherein, in the conversion processing, the ratio of increase in the brightness of the target pixel after conversion from the brightness of the target pixel before conversion differs depending on a preset recording material reduction target value.

3. The image processing apparatus according to claim 1, wherein the edge intensity of the target pixel is extracted by calculating an average value based on the pixel value of the target pixel and pixel values of the surrounding pixels and then by calculating a difference between two pixel values closest to the calculated average value.

4. The image processing apparatus according to claim 1, wherein a corrected brightness value that is after correction for making the brightness value of the pixel in the image data brighter is acquired, and wherein a second brightness value is generated by synthesizing the brightness value of the pixel and the corrected brightness value with each other using a synthesis ratio corresponding to the edge intensity of the pixel.

5. The image processing apparatus according to claim 1, wherein the image data is image data of which density continuously changes.

6. The image processing apparatus according to claim 1, wherein the image data is red-green-blue (RGB) image data.

7. The image processing apparatus according to claim 1, wherein the image processing apparatus performs adjustment toward a target value of a coloring material use amount.

8. A method for performing image processing by an image processing apparatus for processing inputted image data, the method comprising:
extracting edge intensity of a target pixel included in the inputted image data on a basis of the target pixel and surrounding pixels around the target pixel; and
performing conversion processing of converting a pixel value of the target pixel such that brightness of the target pixel becomes greater than brightness of the target pixel before conversion at least in accordance with the extracted edge intensity of the target pixel and the pixel value of the target pixel,
wherein, in the conversion processing, in a case where the pixel value of the target pixel is a first pixel value, the brightness of the target pixel after conversion differs depending on a value of the edge intensity of the target pixel, a ratio of increase in the brightness of the target pixel after conversion from the brightness of the target pixel before conversion decreases as the edge intensity of the target pixel increases, and the ratio of increase in the brightness of the target pixel after conversion from the brightness of the target pixel before conversion increases as the edge intensity of the target pixel decreases, and
wherein, after completion of the conversion processing, an image after the conversion processing is outputted.

9. The method according to claim 8,
wherein, in the conversion processing, the ratio of increase in the brightness of the target pixel after conversion from the brightness of the target pixel before conversion differs depending on a preset recording material reduction target value.

10. The method according to claim 8,
wherein the edge intensity of the target pixel is extracted by calculating an average value based on the pixel value of the target pixel and pixel values of the surrounding pixels and then by calculating a difference between two pixel values closest to the calculated average value.

11. The method according to claim 8,
wherein a corrected brightness value that is after correction for making the brightness value of the pixel in the image data brighter is acquired, and wherein a second brightness value is generated by synthesizing the brightness value of the pixel and the corrected brightness value with each other using a synthesis ratio corresponding to the edge intensity of the pixel.

12. The method according to claim 8, wherein the image data is image data of which density continuously changes.

13. The method according to claim 8, wherein the image data is red-green-blue (RGB) image data.

14. The method according to claim 8, wherein the image processing apparatus performs adjustment toward a target value of a coloring material use amount.

15. A non-transitory computer readable storage medium storing a program which causes a computer to perform a method for performing image processing by an image processing apparatus for processing inputted image data, the method comprising the steps of:

extracting edge intensity of a target pixel included in the inputted image data on a basis of the target pixel and surrounding pixels around the target pixel; and performing conversion processing of converting a pixel value of the target pixel such that brightness of the target pixel becomes greater than brightness of the target pixel before conversion at least in accordance with the extracted edge intensity of the target pixel and the pixel value of the target pixel, wherein, in the conversion processing, in a case where the pixel value of the target pixel is a first pixel value, the brightness of the target pixel after conversion differs depending on a value of the edge intensity of the target pixel, a ratio of increase in the brightness of the target pixel after conversion from the brightness of the target pixel before conversion decreases as the edge intensity of the target pixel increases, and the ratio of increase in the brightness of the target pixel after conversion from the brightness of the target pixel before conversion increases as the edge intensity of the target pixel decreases, and wherein, after completion of the conversion processing, an image after the conversion processing is outputted.

* * * * *